United States Patent [19]

Lin

[11] Patent Number: 5,419,065

[45] Date of Patent: May 30, 1995

[54] ILLUMINATED DISTRESS WARNING SIGN

[76] Inventor: Shih-Chiang Lin, No. 106, Tung-Ho West Street Sec. 2, Shih Lin, Taipei, Taiwan, Prov. of China

[21] Appl. No.: 153,582

[22] Filed: Nov. 17, 1993

[51] Int. Cl.$^6$ ............................................. G09F 13/00
[52] U.S. Cl. .......................................... 40/550; 40/600
[58] Field of Search ................. 40/550, 541, 571, 564, 40/591, 592, 600, 612, 158.1; 362/800, 812; 248/460, 167

[56] References Cited

U.S. PATENT DOCUMENTS

| | | | |
|---|---|---|---|
| 4,096,656 | 6/1978 | Diceglie | 40/564 |
| 4,855,723 | 8/1989 | Fritz et al. | 362/800 X |
| 4,967,317 | 10/1990 | Plumly | 40/550 X |
| 5,031,683 | 7/1991 | Marvy et al. | 248/167 X |
| 5,136,287 | 8/1992 | Borenstein | 362/800 X |

Primary Examiner—Kenneth J. Dorner
Assistant Examiner—Cassandra Davis
Attorney, Agent, or Firm—Shih-Chiang Lin

[57] ABSTRACT

A distress warning sign includes a LED mounting panel mounting with a plurality of light emitting diodes, controlled by a build-in one chip micro computer. The distress warning sign is designed to have a super thin structure and is adapted to be placed on the roof of an automobile to effectively warn coming cars when failure or traffic accident happens. The light emitting diodes on the mounting panel are arranged to form various groups and are operated in selectable operation modes, so that the warning sign either serves as an illuminated distress warning sign for traffic warning sign or an electronic dice game for entertainment.

1 Claim, 4 Drawing Sheets

ILLUMINATED DISTRESS WARNING SIGN

BACKGROUND OF THE INVENTION

The present invention relates to a distress warning sign, and more particularly to a high light LED illuminated distress warning sign with super thin foldable structure. Furthermore, the distress warning sign has two selectable operation modes. The first operation mode serves as a traffic warning sign while the second operation mode serves as an electronic dice game for entertainment.

Nowadays, an auxiliary brake light, known as third brake light, is widely installed on an automobile. The major purpose of the auxiliary brake light is to increase the traffic safety. Therefore, the auxiliary brake light is considered as one of a standard auxiliary warning light of a mobile. Usually, the auxiliary brake light is installed at upper position of an automobile in order to increase the visibility.

Once car accident or engine failure happens to an automobile, according to the traffic rule, the driver must put a distress reflector or distress sign on the ground a few meters behinds the car, so as to warn the coming automobiles. However, in case that the automobile is in motorcade when said situation happens, as the conventional reflector or distress warning sign and car brake light are located at lower position, and are easily hidden from view by another automobiles, the warning effect of the prior art warning sign is limited.

SUMMARY OF THE INVENTION

Consequently, in view of the drawbacks of the prior art distress warning reflector, the primary object of the present invention is to provide an illuminated distress warning sign to effectively warn the coming cars when traffic accident or failure happens. The distress sign includes a LED mounting panel supplied with a plurality of LEDs mounted thereon. The LEDs are preferably arranged to form a well-known traffic warning sign or mark, for example a triangle sign.

The other object of the present invention is to provide an illuminated sign preferably using high performance light emitting diodes, known as high light LED which may increase the visibility of its display.

The other object of the present invention is to provide a foldable distress warning sign with super thin structure. The distress warning sign includes a signal panel, a frame and a stand bar. The stand bar may be rotated to be parallel to the frame when not in use, or to be perpendicular to the frame when in use. The foldable structure is very convenient to be stored.

The other object of the present invention is to provide a distress sign device with two selectable operation modes. The first operation mode serves as a typical illuminated traffic warning sign, while the second operation mode serves as a simulated electronic dice game for entertainment. A plurality of LEDs are mounted on a LED mounting panel in a predetermined arrangement to display a particular visual effect.

The other object of the present invention is to provide an illuminated distress sign controlled by a one chip micro computer. All the LEDs mounted on the sign panel are selectively illuminated under control of the micro computer, according to the selected operation mode. Preferably, the micro computer may control the illuminated display of the distress sign to flash.

The other object of the present invention is to provide a distress warning sign attached with magnetic members so that the distress warning sign may be very convenient to stand on the roof of the automobile by the magnetic force of the magnetic members. Preferably, the distress warning sign may be further attached with a hook and loop type fastening material such as VELCRO (registered trademark of The Velcro Manufacturing Co.) under the magnetic members, so as to stand the distress warning sign on any other suitable place.

These and other objects and features of the invention will become more apparent from the following description taken in connection with the accompanying drawings.

DETAILED DESCRIPTION OF THE INVENTION

Figure 1:
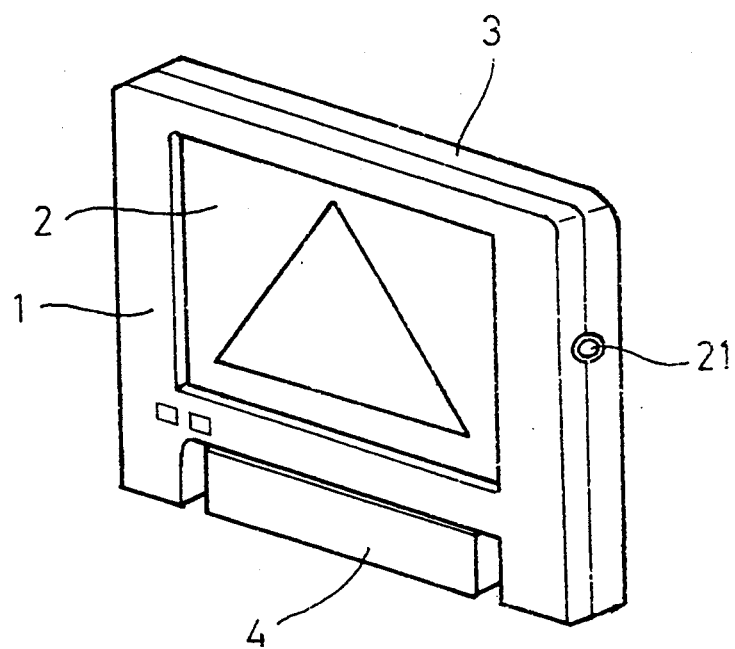
FIG. 1 is a perspective view of the distress warning sign in accordance with the preferred embodiment of the present invention.
Figure 2:
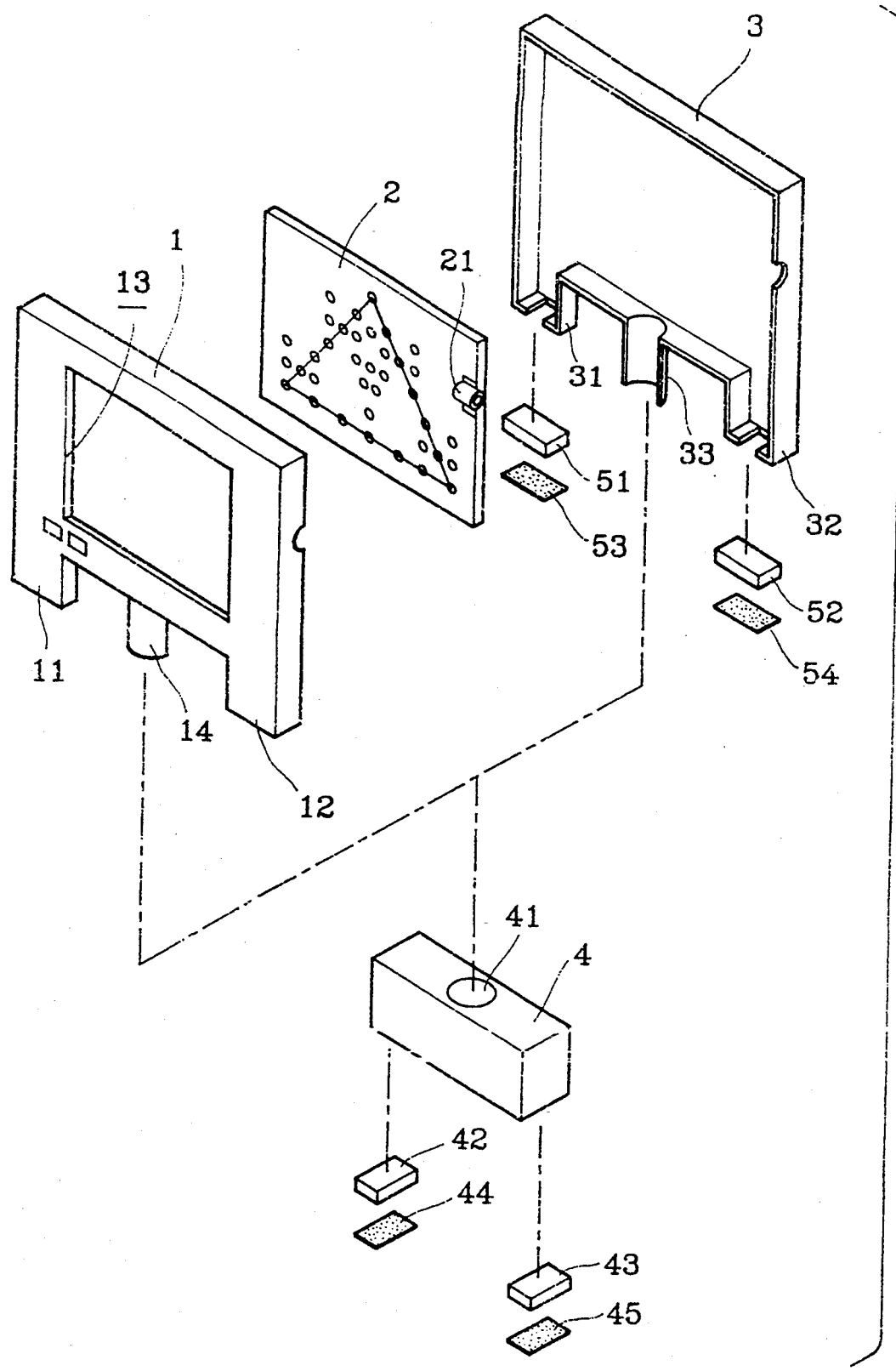
FIG. 2 is an exploded view of the distress warning sign of the present invention shown in FIG. 1.

Referring now to FIG. 1, it shows a perspective view of the distress warning sign of the present invention. The exploded view of the distress warning sign is illustrated in FIG. 2 In accordance with the preferred embodiment of the present invention, the distress warning sign is mainly composed of a front frame 1, a LED mounting panel 2, a rear frame 3, and a stand bar 4. The LED mounting panel 2 is a printed circuit board and is mounted in the inner space formed by the front frame 1 and the rear frame 3 when two frames are assembled. The LED mounting panel 2 is mounted with a plurality of LEDs for providing warning illumination.

Preferably, all the Light Emitting Diodes (abbreviated LEDs) used in this invention are high light LED elements available in the electronic market, and the situation of the LEDs is controlled by a build-in one chip micro computer on the LED mounting panel. The one chip micro computer may be a well-known general purpose single chip microprocessor available in the market.

Figure 3:
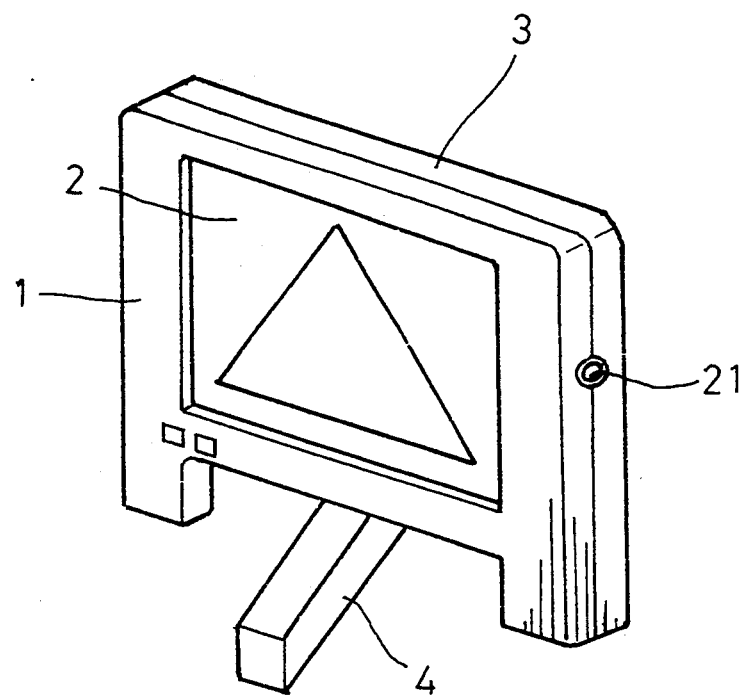
FIG. 3 is a perspective view of the distress warning sign of the present invention, showing that the sign panel is rotated about a stand bar.

The front frame 1, the LED mounting panel 2, and the rear frame 3 in combination constitute an illuminated warning sign of the present invention, by means of the illumination of the LEDs mounted on the LED mounting panel 2. The warning sign may be supported by the stand bar 4 in a rotable and adjustable manner. That is, the stand bar 4 may either be rotable to be parallel to the warning sign panel as illustrated in FIG. 1, or rotated to be perpendicular to the warning sign panel as illustrated in FIG. 3.

The rear frame 3 is a U-shaped structure and has two opposite supporting legs 31 and 32 formed under the bottom side of the frame. The front frame 1 is also provided with two opposite supporting legs 11 and 12 formed under the bottoms side thereof. The front frame 1 is further provided with a viewing window 13 so that it is possible to visually view the illumination of the LED mounting panel 2 through the viewing window 13.

The front frame 1 is provided with a downward half collar 14 integrally formed at the middle section of the bottom side of the front frame 1. Similarly, the rear frame 3 is also provided with a corresponding downward half collar 33 at the middle section of the bottom side of the rear frame 3. Therefore, when the front frame 1 and the rear frame 3 are assembled face to face, two half collars 14 and 33 in combination form a pivotal rod. The stand bar 4 serves as a base, and has a central hole 41 formed on the top surface of the stand bar. So, the warning sign including the front frame 1, the LED mounting panel 2, and the rear frame 3 may be supported by the stand bar 4 by means of inserting the pivotal rod into the central hole 41 of the stand bar 4.

The present invention has two selectable operation modes, the first operation mode serves as an illuminated warning sign for traffic warning sign while the second operation mode serves as an electronic dice game for entertainment. On the front panel of the front frame 1, there are provided with two control switches SW1 and SW2. The first control switch SW1 serves a warning mode selecting switch, while the second control switch SW2 serves an electronic dice game mode selecting switch.

In the preferred embodiment of the present invention, the front frame 1 and the rear frame 3 may be provided with two magnetic members 51 and 52 attached to the bottom surface of the supporting legs 11 and 12 respectively. Furthermore, each of the magnetic members 51 and 52 may be attached with a well-known strips 53 and 54 of VELCRO material on the bottom surface of the magnetic member respectively.

Similarly, the stand bar 4 may be provided with two magnetic members 42 and 43 attached to the bottom surface of the stand bar 4 and there are two strips 44 and 45 of VELCRO material attached on the bottom surface of the magnetic members 42 and 43 respectively.

Because the frame composed of a front frame and a rear frame of the present invention has a U-shaped structure, the stand bar 4 may be rotated to be positioned under the frame of the sign. Therefore, the distress sign of the present invention is convenient to be foldable and portable. In addition, the stand bar 4 may not be separated from the frame because that both the frames and the stand bar are attracted by means of the magnetic members having strong mutual magnetic force.

In operation, it is only necessary to simply rotate the stand bar 4 to make it perpendicular to the frame, and then it is possible to place the warning sign on the roof of a mobile. At this time, the magnetic members attached under the frame and the stand bar will strongly attract the roof of the mobile. In alternative, the warning sign is possible to be attached at any other desired place by means of the strips of VELCRO material. In practical use, the warning sign has a DC power jack 21 and may be powered by connecting a power cord to existing cigarette socket of the mobile. Besides, because the magnetic member is attached with a layer of VELCRO material, it is possible to effectively prevent the paint of the mobile from scraping.

Figure 4:
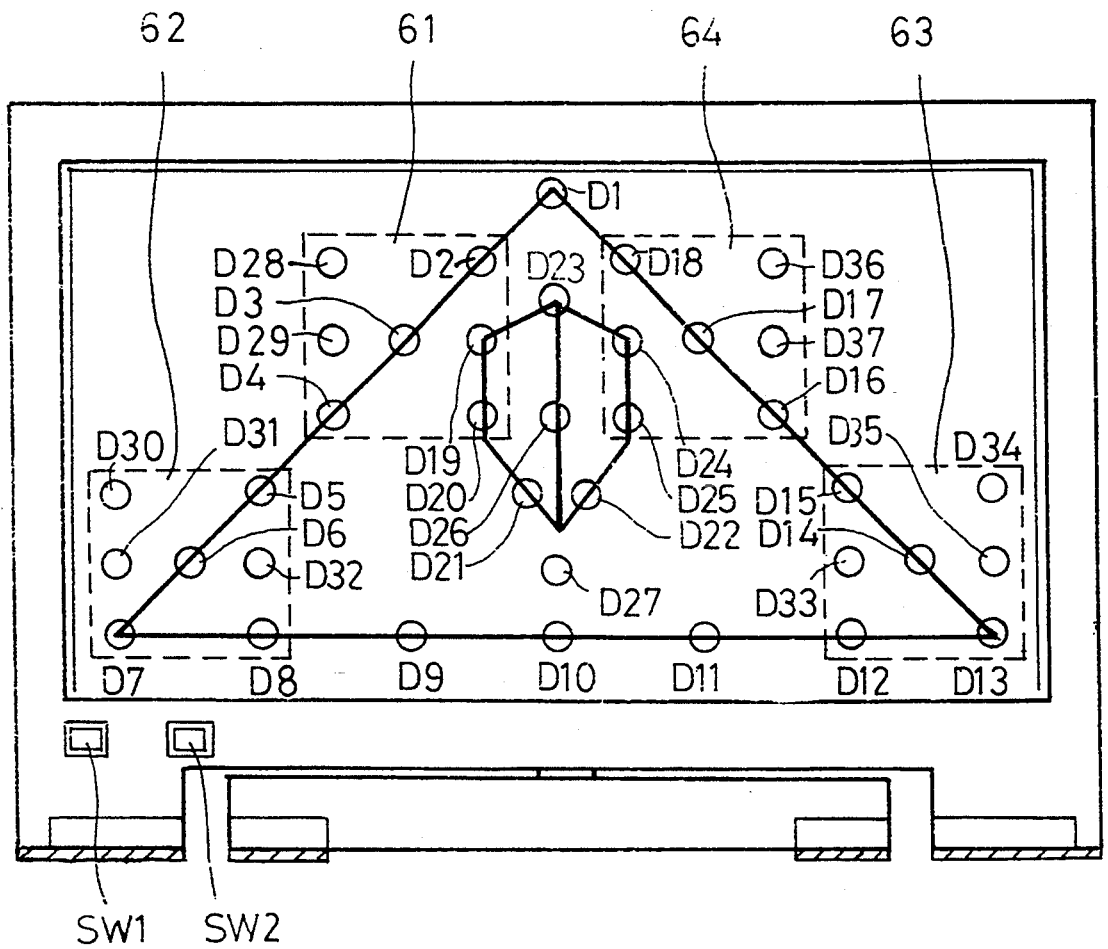
FIG. 4 illustrates a preferred arrangement of the high light LEDs on the LED mounting panel of the present invention.

FIG. 4 illustrates a preferred arrangement of the LEDs on the LED mounting panel 2 of the present invention. As shown in the drawing, there are provided with a plurality of LEDs on the LED mounting panel 2 in a predetermined arrangement. The LEDs on the mounting panel 2 may be divided to three major groups for description, and all the LEDs are controlled by a single chip micro computer (not shown) which may be mounted on the LED mounting panel 2.

The first LED group includes a plurality of LEDs D1 to D18, arranged in a form of a right triangle sign on the LED mounting panel 2. The second LED group includes a plurality of LEDs D19 to D27, arranged in a form of an exclamation mark positioning within the triangle sign on the mounting panel 2. The first and second LEDs groups may present a distress warning sign by illuminating the LEDs under control of the single chip micro computer.

When the control switch SW1 on the front frame 1 is depressed (turned on), the present invention is operated in warning sign mode. In this mode, the LEDs D1–D18, and D19–D27 will flash at a speed of two times per second under control of the one chip micro computer. That is, a right triangle warning sign and an exclamation mark are illuminated at same time in this operation mode.

The third LED group consist of four subgroups 61, 62, 63, and 64, serving as an electronic dice game illumination. The first subgroup 61 includes LEDs D2, D3, D4, D19, D20, D28, and D29 arranged in a square form serving as a first electronic dice game area. The second subgroup 62 includes LEDs D5, D6, D7, D8, D30, D31, and D32 arranged in a square form serving as a second electronic dice game area. The third subgroup 63 includes LEDs D12, D13, D14, D15, D33, D34, and D35 arranged in a square form serving as a third electronic dice game area. The forth subgroup 64 includes LEDs D16, D17, D18, D24, D25, D36, and D37 arranged in a square form serving as a forth electronic dice game area. It is noted that some of the LEDs located in the third group are common with the first group and/or second group.

Once the control switch SW1 is turned off, the present invention will operate in electronic dice game mode. At this mode, all the LEDs of the four subgroups 61, 62, 63, and 64 of the third LED group described above will generate a set of random numbers to simulate a well-known dice game every time the second control switch SW2 is depressed.

In conclusion, from the detail description above, it is obvious that the present invention has improvement in structure and is a novelty distress sign. Therefore, the present invention meets the requirements of invention. While the arrangement and structure described above constitutes a preferred embodiment of this invention, it is to be understood that the present invention is not limited to this precise form and that changes may be made therein without departing from the scope and spirit of the invention as defined in the appended claim.

I claim:

1. An illuminated distress warning sign comprising:
   a frame consisting of a front frame and a rear frame, the front frame being provided with a viewing window, the frame having a U-shaped lower edge forming two opposite supporting legs being attached with a magnetic member respectively for magnetically attracting the warning sign in position, the frame being further provided with a pivot rod below the lower edge thereof;
   a LED mounting panel with a plurality of LEDs, mounted between the front frame and the rear frame, said LEDs being arranged to face the viewing window of the front frame; and
   a stand bar pivotally connected to the pivot rod of the frame for supporting the front frame, the rear frame and the LED mounting panel thereon.

* * * * *